Patented Sept. 14, 1954

2,689,255

UNITED STATES PATENT OFFICE 2,689,255

PREPARATION OF TERT.-OCTYL ISOTHIOCYANATE

W E Craig and Leo S. Luskin, Philadelphia, Pa., assignors to Rohm & Haas Company, Philadelphia, Pa., a corporation of Delaware No Drawing. Application February 26, 1952, Serial No. 273,571

5 Claims. (Cl. 260—454)

This invention concerns tert.-octyl isothiocyanate and a method for its preparation. It also deals with the application of this method to a narrow group of olefins as reactants in this method.

Olefins of various types have been taken as possible reactants with thiocyanogen or with thiocyanic acid. In some cases reaction was obtained with formation of alkyl thiocyanates or mixtures of thiocyanates and isothiocyanates. In other cases the olefins did not react, at least under the conditions employed or at most only traces of undefined products resulted.

We have found conditions under which diisobutylene is reacted with a soluble inorganic thiocyanate and aqueous sulfuric acid to form pure tert.-octyl isothiocyanate in fairly good yields. This method is more convenient and more economical than a method which would follow the conventional steps of preparation of an amine of the particular configuration here required and conversion of the amine to the isothiocyanate.

Our method comprises mixing diisobutylene and a dry alkali metal thiocyanate and treating this mixture with stirring with aqueous 40% to 83% sulfuric acid between 20° and about 60° C. Ammonium thiocyanate can be used in place of sodium or potassium thiocyanate, but yields are less favorable. The optimum concentration of acid appears to be 70% to 75% and use of some excess acid improves yields.

After the reaction mixture has been stirred for a time sufficient to permit good utilization of reactants, it is treated with water. An organic layer forms, which is taken off. This layer is purified by such steps as washing with water and/or with a solution of a mildly alkaline reagent, filtering, if necessary, drying if desired, and distilling. Unreacted diisobutylene can be recovered and reused.

A typical preparation of tert.-octyl isothiocyanate was performed as follows: A slurry was made by mixing 56 parts by weight of diisobutylene and 42 parts of sodium thiocyanate. To this slurry there was slowly added with vigorous stirring 33.5 parts of 73% sulfuric acid. The mixture was cooled to maintain the temperature thereof between 30° and 40° C. The mixture was stirred for six hours, diluted with 200 parts of water, and allowed to form layers. The upper layer was washed with a sodium bicarbonate solution and distilled with fractionation to give 10 parts of diisobutylene and 54 parts of tert.-octyl isothiocyanate, a pale amber liquid distilling at 91°–97° C./10 mm. It has a specific gravity at 25° C. of 0.910 and a refractive index, $n_D^{20}$, of 1.4786.

This compound has the structural formula

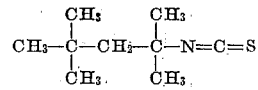

It reacts with tert.-octylamine to give di-tert.-octyl thiourea slowly but in excellent yields. This thiourea is a white crystalline solid melting at 112° C. Reaction with ammonia yields tert.-octyl thiourea, a crystalline solid melting at about 85° C. Reaction with isopropylamine gives isopropyl tert.-octyl thiourea, a white crystalline solid melting at 79° C.

Analytical tests of the above product with silver nitrate show the complete absence of thiocyanate. Standard qualitative procedures for thiocyanate involving alcoholic potassium hydroxide, ferrous sulfate, and ferric chloride and also sodium sulfide and ferric chloride give negative results, indicating the absence of thiocyanate.

The above reaction has been applied to other olefinically unsaturated compounds. In some cases no reaction is obtained. In some cases, as, for example, with isobutylene, the product is a mixture of thiocyanate and isothiocyanate. In other cases thiocyanates are formed. Yet in a few other cases isothiocyanates are formed. These are characterized by the reaction taking place with an olefinically unsaturated hydrocarbon having six to about nine carbon atoms, the olefinic unsaturation thereof being characterized by steric crowding about the double bond. This apparently promotes the abnormal reaction giving exclusively isothiocyanates. This method, therefore, yields isothiocyanates in which the isothiocyanate group is attached to an aliphatic carbon atom which is tertiary.

The olefinically unsaturated hydrocarbons which are useful in the reaction of this invention have a terminal olefinic group carried by a carbon atom free of hydrogen. This form may be in desmotropic equilibrium with a second isomeric form, which under the conditions of the reaction is capable of yielding the form in which the olefinic linkage is in a terminal position. Formation of a tert.-alkyl isothiocyanate is effected by mixing an olefinic hydrocarbon having six to nine carbon atoms and having the defined olefinic group with a soluble inorganic thiocyanate and treating the resulting mixture with aqueous 40% to 83% sulfuric acid at a temperature between about 20° and about 60° C.

Specific olefins giving the reaction are isohexene, isoheptene, diisobutylene, and isononene. Also, α-methylstyrene undergoes the same reaction. The products in each case are isothiocyanates in which the isothiocyanate group is attached to a tertiary aliphatic carbon atom.

These isothiocyanates are resistant to hydrolysis with dilute acids but may be hydrolyzed with aqueous sodium hydroxide. The product isolated is not, however, the expected amine but the disubstituted thiourea. These compounds and their thiourea derivatives are interesting as inhibitors. The tert.-alkyl isothiocyanates react with proteinaceous materials such as wool and casein to decrease their water-sensitivity; but they differ from non-tertiary isothiocyanates in that rather surprisingly they do not react with hydroxy compounds to give thiourethanes as do isothiocyanates having, for example, primary alkyl groups.

We claim:

1. The method of preparing tert.-octyl isothiocyanate which comprises mixing diisobutylene and a soluble inorganic thiocyanate, treating this mixture at a temperature between about 20° and about 60° C. with aqueous sulfuric acid of 40% to 83% strength, and separating said isothiocyanate.

2. The method of claim 1 in which the thiocyanate used is sodium thiocyanate.

3. The method of preparing tert.-alkyl isothiocyanates having six to nine carbon atoms in the alkyl portion thereof which comprises mixing an olefin, of six to nine carbon atoms, having a terminal olefinic group on a carbon atom free of hydrogen with a soluble inorganic thiocyanate, treating this mixture between 20° and about 60° C. with aqueous sulfuric acid of 40% to 83% strength and separating said isothiocyanate.

4. The method of claim 3 in which the thiocyanate used is sodium thiocyanate.

5. The method of preparing isothiocyanates in which the isothiocyanate group is attached to a tertiary aliphatic carbon atom which comprises mixing a hydrocarbon which contains six to nine carbon atoms and has a terminal olefinically unsaturated group carried by an aliphatic carbon atom attached only to carbon and a soluble inorganic thiocyanate and treating the resulting mixture between about 20° and about 60° C. with aqueous 40% to 83% sulfuric acid.

References Cited in the file of this patent

UNITED STATES PATENTS

| Number | Name | Date |
|---|---|---|
| 1,992,533 | Lee | Feb. 26, 1935 |
| 1,993,040 | Salzberg et al. | Mar. 5, 1935 |
| 2,486,090 | Abramovitch | Oct. 25, 1949 |

OTHER REFERENCES

Kaharasch et al.: Jour. Am. Chem. Soc., vol 59 (1937), 1580.